United States Patent Office 2,929,818
Patented Mar. 22, 1960

2,929,818
4-PHENYL-1,2,3,6-TETRAHYDROPYRIDINE-1-ALKANOIC ACID AMIDES

Paul Adriaan Jan Janssen, Vosselaar, near Turnhout, Belgium

No Drawing. Application December 22, 1958
Serial No. 781,881

9 Claims. (Cl. 260—295)

This invention relates to tetrahydropyridine derivatives. The novel compounds are 4-phenyl-1,2,3,6-tetrahydropyridine-1-alkanoic acid amides of the general structural formula

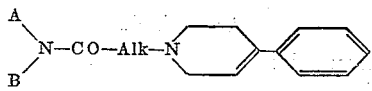

and the non-toxic salts thereof, wherein A is a cyclopentyl, cyclohexyl, phenyl, flurophenyl, chlorophenyl, bromophenyl, iodophenyl, nitrophenyl, or tolyl radical, wherein B is a hydrogen or lower alkyl radical, and wherein Alk is a lower alkylene radical.

Among the radicals which B can represent are such lower alkyl groups as methyl, ethyl, propyl, butyl, pentyl, and hexyl, wherein the propyl, butyl, pentyl, and hexyl groups may be either of the straight-chain or branch-chain type.

The radical Alk represents a lower alkylene radical such as methylene, ethylene, propylene, trimethylene, tetramethylene, methylpropylene pentamethylene, and hexamethylene.

The organic bases of the foregoing type form pharmaceutically useful non-toxic salts with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene-sulfonate, ethyl toluenesulfonate, ethylenechlorohydrin, propylenechlorohydrin, allyl bromide, methallyl bromide and crotyl bromide.

The compounds of this invention can be prepared by condensing an appropriately selected haloalkanoic acid amide of the formula

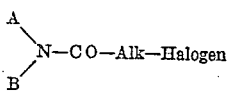

with 4-phenyl-1,2,3,6-tetrahydropyridine, wherein A, B, and Alk are defined as above. The reaction can be carried on in an inert solvent such as an aromatic hydrocarbon (e.g. benzene, toluene), a lower alkanol (e.g. ethanol, butanol), a lower alkanone (e.g. butanone, pentanone), and dioxane. The reaction is accelerated by the use of elevated temperatures.

The haloalkanoic acid amides used as intermediates can be prepared by the condensation of an amide of the formula ANBH with a compound of the formula Halogen-CO-Alk-Halogen wherein A, B, and Alk are defined as above.

The compounds of this invention are valuable pharmaceutical agents. They are potent depressants of the central nervous system. They potentiate barbiturate hypnosis and inhibit the righting reflex in experimental animals.

The compounds which constitute this invention and the methods for their preparation will appear more fully from a consideration of the following examples, which are given for the purpose of illustration only and are not to be construed as limiting the invention in spirit or in scope. In these examples quantities are given in parts by weight and temperatures in degrees centigrade (° C.).

Example 1

In a bomb a mixture of 9.5 parts of N-cyclohexyl-β-chloropropionamide, 15.9 parts of 4-phenyl-1,2,3,6-tetrahydropyridine, and 0.1 part of potassium iodide in 100 parts of toluene is heated for 50 hours at a temperature of 140–150° C. The contents of the bomb are cooled and filtered. The filtrate is treated with a mixture of 500 parts of 10% hydrochloric acid and 400 parts of ether to yield the hydrochloride which is then collected on a filter and washed with ether. A second crop is obtained by passing anhydrous hydrogen chloride gas through the etheric solution. The product is collected on a filter and recrystallized from isopropanol. In this manner there is obtained N-cyclohexyl-β-(4-phenyl-1,2,3,6-tetrahydropyridine)propionamide hydrochloride melting at 218–219.5° C.

Substitution of nine parts of N-cyclopentyl-β-chloropropionamide for N-cyclohexyl-β-chloropropionamide in the foregoing procedure yields the white crystals of N-cyclopentyl-β-(4-phenyl-1,2,3,6-tetrahydropyridine)propionamide hydrochloride. The structural formula is

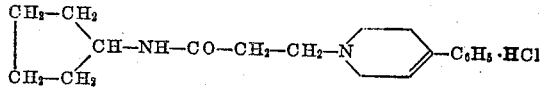

Example 2

A mixture of 10.2 parts of N-cyclohexyl-γ-chlorobutyramide, 15.9 parts of 4-phenyl-1,2,3,6-tetrahydropyridine, and 0.1 part of potassium iodide in 120 parts of toluene is heated in a sealed tube for 72 hours at a temperature of 140–150° C. The reaction mixture is treated with water, and the organic layer is separated and diluted with ether. Dry, gaseous hydrogen chloride is passed through the solution, whereupon there is obtained an oily hydrochloride which is collected, dissolved in water, and treated with sodium hydroxide solution. The liberated base is dissolved in ether and the solution is evaporated to dryness. On scratching in acetone, a solid is formed which is then dissolved in diisopropyl ether. Upon standing at −20° C., there precipitates the product which is collected on a filter and recrystallized from diisopropyl ether to yield N-cyclohexyl-γ-(4-phenyl-1,2,3,6-tetrahydropyridine)propionamide melting at 119.8–121.6° C.

Example 3

In an open flask a mixture of 8.4 parts of α-chloroacetanilide and 15.9 parts of 4-phenyl-1,2,3,6-tetrahydropyridine in 200 parts of isopropanol is refluxed for 7 hours. The solvent is evaporated and the residue is treated with water and ether. The ether layer is separated and washed with water, whereupon there precipitates α-(4-phenyl-1,2,3,6-tetrahydropyridin)acetanilide melting at 120-122.2° C. Dry, gaseous hydrogen chloride is introduced into the filtrate to yield an oily precipitate. The salt is first recrystallized from isopropanol and then from a mixture of 720 parts of isopropanol and 200 parts of acetone to yield α-(4-phenyl-1,2,3,6-tetrahydropyridin)acetanilide hydrochloride melting at 233.5–235° C.

Example 4

In a sealed reactor a mixture of 10.5 parts of β-chloropropionanilide, 15.9 parts of 4-phenyl-1,2,3,6-tetrahydropyridine, and 0.1 part of potassum iodide in 160 parts of toluene is heated for 72 hours at a temperature of 140–150° C. The mixture is treated with water and ether, and the organic layer is separated, dried over anhydrous potassium carbonate, and filtered. Upon passing dry hydrogen chloride gas through the solution, the hydrochloride precipitates. This salt is purified by recrystallization from acetone to yield β-(phenyl - 1,2,3,6-tetrahydropyridine)propionanilide hydrochloride melting at 249.5–251.5° C.

Example 5

Substitution of 10.1 parts of β-chloro-p-fluoropropionanilide for N-cyclohexyl-β-chloropropionamide in Example 1 yields the impure hydrochloride which is purified by recrystallization from isopropanol to yield β-(4-phenyl-1,2,3,6 - tetrahydropyridine) - p - fluoropropionanilide hydrochloride melting at 247–249° C.

Example 6

In a sealed reactor a mixture of 13 parts of β,o-dichloropropionanilide, 15.9 parts of 4-phenyl-1,2,3,6-tetrahydropyridine, and 0.1 part of potassium iodide in 160 parts of toluene is heated for 18 hours at a temperature of 140–150° C. The reaction mixture is cooled, treated with 1000 parts of water and 400 parts of ether, and filtered. The remaining solid is recrystallized from diisopropyl ether to yield β-(4-phenyl-1,2,3,6-tetrahydropyridine)-o-chloropropionanilide melting at 130.6–131.6° C. From the filtrate the organic layer is separated, dried over anhydrous potassium carbonate, and filtered. Anhydrous hydrogen chloride gas is introduced into the solution, whereupon there precipitates the hydrochloride which is then collected and recrystallized from a mixture of equal parts of acetone and isopropanol to yield β-(4-phenyl-1,2,3,6 - tetrahydropyridine) - o - chloropropionanilide melting at 201–202.5° C.

Example 7

A mixture of 11 parts of β,m-dichloropropionanilide, 15.9 parts of 4-phenyl-1,2,3,6-tetrahydropyridine, and 0.1 part of potassium iodide in 160 parts of toluene is heated for 18 hours at a temperature of 140–150° C. The contents of the bomb are cooled and then treated with 1000 parts of water and 400 parts of ether. The mixture is filtered, and the organic layer is separated, dried over anhydrous potassium carbonate, and filtered. Anhydrous hydrogen chloride gas is passed through the filtrate, whereupon there is obtained a crude salt which is recrystallized from an equal parts mixture of acetone and isopropanol to yield β-(4-phenyl-1,2,3,6-tetrahydropyridine)-m-chloropropionanilide hydrochloride melting at 234.5–236° C.

Example 8

Substitution of 11 parts of β,p-dichloropropionanilide for β-chloropropionanilide in Example 4 yields β-(4-phenyl - 1,2,3,6 - tetrahydropyridine) - chloropropionanilide hydrochloride melting at 253–254.5° C.

Example 9

Substitution of 15.1 parts of β-chloro-p-bromopropionanilide and 17.8 parts of β-chloro-p-iodopropionanilide for β-chloropropionanilide in the procedure used in Example 4 yields β-(4-phenyl-1,2,3,6-tetrahydropyridine)-p-bromopropionanilide hydrochloride and β - (4 - phenyl-1,2,3,6 - tetrahydropyridine) - p - iodopropionanilide, respectively.

Example 10

A mixture of 10.5 parts of β-chloro-o-propionotoluide, 15.9 parts of 4-phenyl-1,2,3,6-tetrahydropyridine, and 0.1 part of potassium iodide in 160 parts of toluene is heated in a sealed reactor for 72 hours at a temperature of 140–150° C. After cooling and decantation, the oily precipitate is treated with water and ether. A sodium hydroxide solution is added after which the aqueous layer is extracted with diisopropyl ether. At about —15° C., β - (4 - phenyl - 1,2,3,6 - tetrahydropyridine) - o - propionotoluide crystallizes. The base melts at 122.5–123.4° C.

Example 11

Substitution of 9.9 parts of β-chloro-m-propionotoluide for N-cyclohexyl-β-chloropropionamide in Example 1 yields a crude product which is recrystallized from a mixture of 300 parts of benzene and 120 parts of isopropanol to yield β - (4 - phenyl - 1,2,3,6 - tetrahydropyridine)-m-propionotoluide hydrochloride melting at 239.5–240.5° C.

Example 12

Substitution of 10 parts of β-chloro-p-propionotoluide for the β,o-dichloropropionanilide in Example 6 yields β - (4 - phenyl - 1,2,3,6 - tetrahydropyridine) - p - propionotoluide melting at 155–156° C. and β-(4-phenyl-1,2,3,6 - tetrahydropyridine) - p - propionotoluide hydrochloride melting at 252–253.5° C.

Example 13

In a comb a mixture of 11.5 parts of β-chloro-o nitropropionanilide, 15.9 parts of 4-phenyl-1,2,3,6-tetrahydropyridine, and 0.1 part of potassium iodide in 80 parts of toluene is heated for 50 hours at a temperature of 140–150° C. The reaction mixture is cooled and then treated with water and ether. The ether layer is separated, dried over anhydrous potassium carbonate, and filtered. The crude product is obtained by passing anhydrous hydrogen chloride gas through the solution. The hydrochloride is boiled with a mixture of 96 parts of isopropanol and 240 parts of acetone. The resulting suspension is filtered, and the filtrate is cooled to yield β-(4-phenyl-1,2,3,6-tetrahydropyridine)-o-nitropropionanilide hydrochloride. The remaining solid is recrystallized from methanol to yield a second crop melting at 196.4–198° C.

Example 14

Substitution of 9.9 parts of γ-chlorobutyranilide for the N-cyclohexyl-β-chloropropionamide used in Example 1 yields an oily precipitate which is solidified by treatment with acetone. The residue is recrystallized from an equal parts mixture of acetone and methanol to yield γ-(4-phenyl-1,2,3,6-tetrahydropyridine)butyranilide hydrochloride melting at 211–213.5° C.

Example 15

A mixture of 11 parts of γ-chloro-p-fluorobutyranilide, 15.9 parts of 4-phenyl-1,2,3,6-tetrahydropyridine, and 0.1 part of potassium iodide and 80 parts of toluene is heated in a bomb for 80 hours at a temperature of 135–150° C. The contents of the bomb are taken up in water and ether. The aqueous layer is separated and extracted with ether. The combined ether solutions are dried over anhydrous potassium carbonate and filtered, whereupon dry, gaseous hydrogen chloride is introduced into the solution. The solvent is decanted, and the oily hydrochloride solidifies in acetone. The salt is recrystallized from isopropanol to yield γ-(4-phenyl-1,2,3,6-tetrahydropyridine)-p-fluorobutyranilide hydrochloride melting at 208.5–210.6° C.

Example 16

In a sealed reactor a mixture of 10.3 parts of γ-chloro-β-methylbutyranilide, 15.9 parts of 4-phenyl-1,2,3,6-tetrahydropyridine, and 0.1 part of potassium iodide in 100 parts of toluene is heated for 60 hours at a temperature of 140–150° C. The reaction mixture is cooled and filtered. To the filtrate are added 500 parts of 10% hydrochloric acid and 400 parts of ether. The resulting precipitate is collected on a filter and recrystallized from isopropanol. In this manner, there is obtained in colorless needles β-methyl-γ-(4-phenyl-1,2,3,6-tetrahydropyridine)butyranilide hydrochloride.

Example 17

In a bomb a mixture of 11.4 parts of N-methyl-β-chloropropionanilide, 15.9 parts of 4-phenyl-1,2,3,6-tetrahydropyridine, and 0.1 part of potassium iodide in 160 parts of toluene is heated for 70 hours at a temperature of 140–150° C. The contents of the bomb are cooled and treated with water and ether. The organic layer is separated, dried over anhydrous potassium carbonate, and filtered. Dry, gaseous hydrogen chloride is introduced into the solution. The resulting precipitate is collected on a filter and purified by recrystallization from acetone to yield N-methyl-β-(4-phenyl-1,2,3,6-tetrahydropyridine)propionanilide hydrochloride.

Substitution of 13 parts of N-propyl-β-chloropropionanilide for the N-methylpropionanilide in the foregoing procedure yields the white prismatic crystals of N-propyl-β-(4-phenyl-1,2,3,6-tetrahydropyridine)propionanilide hydrochloride of the structural formula

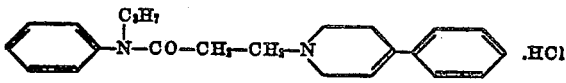

What is claimed is:

1. A compound of the structural formula

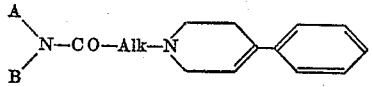

wherein A is a member of the class consisting of cyclopentyl, cyclohexyl, phenyl, halophenyl, nitrophenyl, and tolyl radicals, B is a member of the class consisting of hydrogen and lower alkyl radicals, and Alk is a lower alkylene radical.

2. A compound of the structural formula

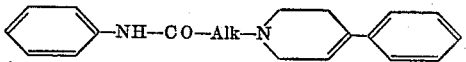

wherein Alk is a lower alkylene group.

3. β-(4-phenyl-1,2,3,6-tetrahydropyridine)propionanilide.

4. γ-(4-phenyl-1,2,3,6-tetrahydropyridine)butyranilide.

5. A compound of the structural formula

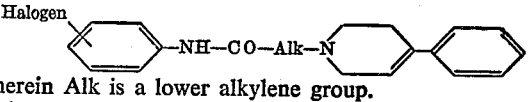

wherein Alk is a lower alkylene group.

6. β-(4-phenyl-1,2,3,6-tetrahydropyridine)fluoropropionanilide.

7. γ-(4-phenyl-1,2,3,6-tetrahydropyridine)fluorobutyranilide.

8. A compound of the structural formula

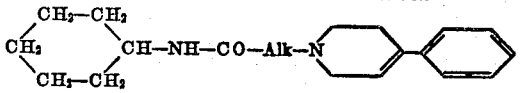

wherein Alk is a lower alkylene group.

9. N-cyclohexyl-γ-(4-phenyl-1,2,3,6-tetrahydropyridine)butyramide.

No references cited.